Aug. 26, 1958 G. A. FRANK ET AL 2,849,068
MACHINE FOR SEPARATING AND DISPENSING
STACKED ADHESIVELY UNITED ARTICLES
Filed June 2, 1953 2 Sheets-Sheet 1

INVENTORS
G. A. FRANK
W. J. TESCHE
BY W.C.Parnell
ATTORNEY

Aug. 26, 1958  G. A. FRANK ET AL  2,849,068
MACHINE FOR SEPARATING AND DISPENSING
STACKED ADHESIVELY UNITED ARTICLES
Filed June 2, 1953
2 Sheets-Sheet 2
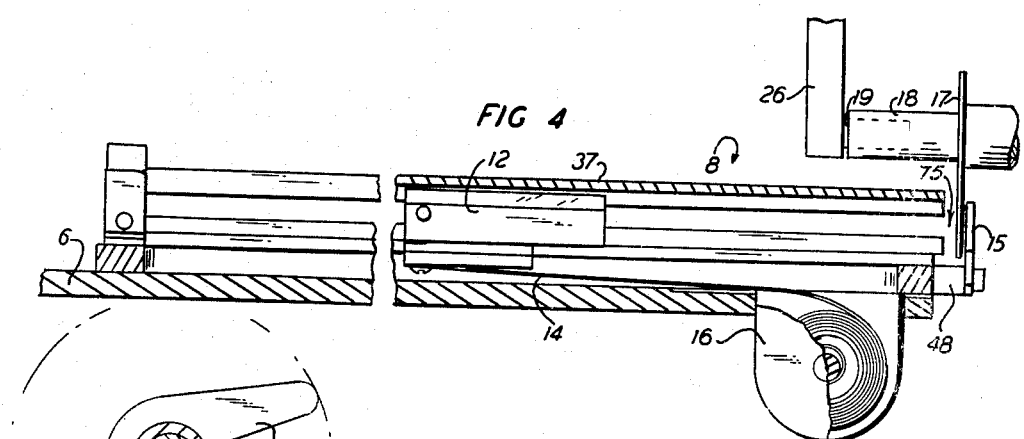
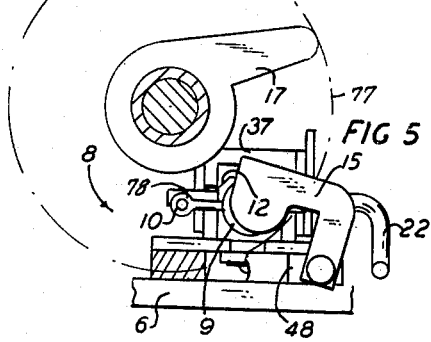
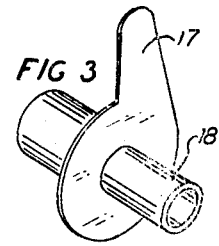
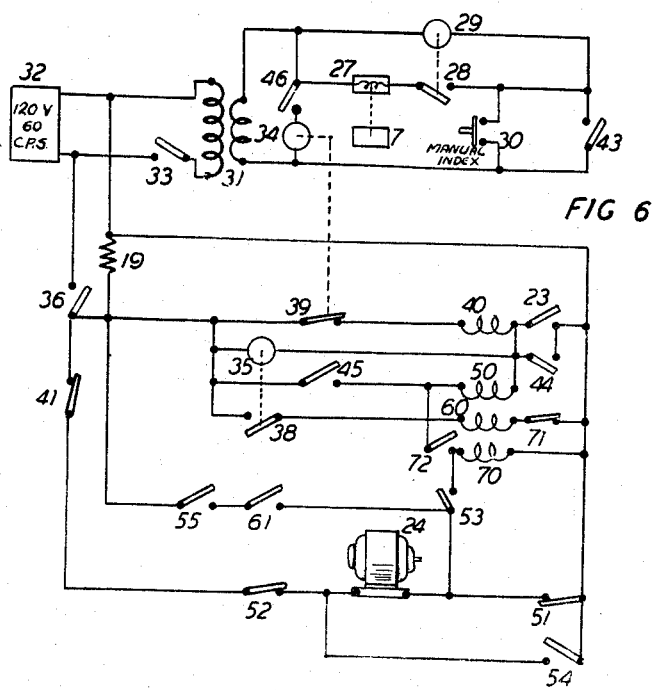
INVENTORS
G. A. FRANK
W. J. TESCHE
BY *W.C. Parnell*
ATTORNEY

United States Patent Office 2,849,068
Patented Aug. 26, 1958

2,849,068
MACHINE FOR SEPARATING AND DISPENSING STACKED ADHESIVELY UNITED ARTICLES

Gerard A. Frank, Allentown, and Walter J. Tesche, Coopersburg, Pa., assignors to Western Electric Company, Incorporated, New York, N. Y., a corporation of New York Application June 2, 1953, Serial No. 359,099

5 Claims. (Cl. 164—84.5)

This invention relates to an article separating machine and particularly to a device for separating artcles that are aligned in stacks.

In the manufacture of small electrical units such as varistors, assembled units are strung on rods through a hole provided on one of the terminals thereof and submerged in a wax impregnation bath to fill all voids inside the units. The highly viscous wax remaining on the outside has to be removed as the units must be clean for handling purposes. This is accomplished in a wax removing machine, however, in order to properly clean the units, they must be separated before being placed in the machine. Heretofore, this separating operation was done by hand.

It is the general object of this invention to provide a device for rapidly and automatically separating such articles while requiring a minimum of handling.

According to the general features of the invention, this object is attained by providing an automatic indexing table which carries a plurality of radially disposed stacks of the articles, each stack being spring loaded against a peripheral stop. At the separating position, a revolving finger shears off the articles one at a time and as each stack is exhausted, the table is automatically indexed to bring the next full stack into the separating position.

These and other features of the invention will be more fully understood from the following detailed description taken in conjunction with the accompanying drawing in which:

Fig. 3 is an isometric view of the rotatable finger of the device of Fig. 1;

Fig. 4 is a side elevational view of one of the stack positions of the device of Fig. 1;

Fig. 5 is a partially broken away end view of Fig. 4; and

Fig. 6 is a schematic diagram of the control circuit for the device of Fig. 1.

Figures 1, 2:
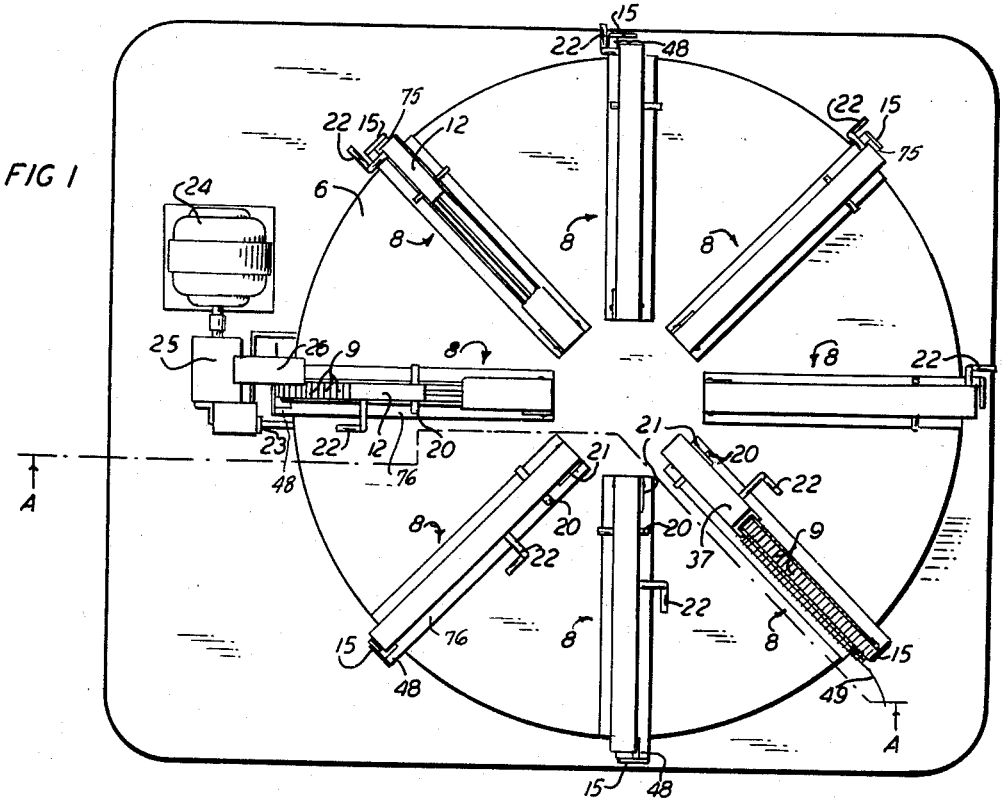
Fig. 1 is a plan view of a machine according to the invention.
Fig. 2 is a side elevational view taken along the line A—A of Fig. 1.

Referring now to Figs. 1 through 5 of the drawings, a round indexing table 6 is provided with an air cylinder actuator 7 which is not shown in detail since indexing actuators are well known in the art and commercially available. The table 6 is provided with an indexing position corresponding to each of eight radially disposed covered troughs 8 for receiving the varistor stacks.

Each stack of varistors, positioned in its trough 8, is pushed against a peripheral stop 15, located slightly beyond the outer edge of the turntable, by a pusher 12 which, through the steel tape 14 (Fig. 4), is spring loaded against the stack by a spiral spring mechanism contained in the housing 16. The pusher 12 is provided with a pin 20 for engaging a latching member 21 for locking the pusher in the loading position. The pusher is also provided with an extending actuator 22 for the microswitch 23, the operation of which will be explained in connection with the description of the control circuit shown in Fig. 6.

The stops 15 are supported beyond the peripheral edge of the turntable 6 and the end of the channel shaped troughs 8 by extensions 48 of the trough base members 76. When a trough 8 is located in the article separating position, the opening 75 between the stop 15 and the end of the channel shaped trough 8 provides a passage for the finger 17, which is rotated clockwise (as seen in Fig. 5), such that the end of the finger, following the circular path 77, pushes the varistor 9 next to the stop 15 out and down from the turntable. In this article discharging position the support extension 48 is located outside of the path of the rotating finger. The width of the opening 75 is about one ond one-half times the thickness of one of the varistors so that only one of them will be sheared off the stack for each revolution of the finger.

The finger 17 is supported above the turntable 6 and is driven by motor 24 through a speed reduction unit 25 so that it is rotated at a low speed to prevent damage to the articles from the impact of the finger. Attached to the finger 17, and extending coaxially from the shaft driving the finger 17, is a tubular portion 18 (Fig. 3). A cartridge type electric heating element 19, mounted on the bracket 26 fits within this tubular portion 18 and heats it and the finger 17 to melt off the wax which is picked up from the surface of the varistors thereby keeping the finger clean.

The varistors 9, as supplied to the separating machine from the wax impregnating bath, are aligned in stacks of successive units, adhesively united and strung on rigid rods 49 (Fig. 1) through the holes 10 in terminals 78 (Fig. 5) from which the varistors are hung in the wax impregnating bath.

To load the individual positions on the index table, the operator raises the trough cover 37, moves the spring loaded pusher 12 back until the pin 20 thereon engages the latch 21; he then lays an adhesively united stack in the open trough, lowers the cover down over the stack and releases the spring loaded pusher 12 to force the stack against the peripheral stop 15; he then withdraws the rod 49 from the holes 10 in the terminals 78 to complete the loading of the position.

Referring now to the circuit diagram of Fig. 6, the indexing table actuator 7 is operated by a solenoid 27 which is energized through the normally open contacts 28 of a time delay 29 and the contacts of a "manual index" push button switch 30 from the secondary winding of a step-down transformer 31 which, in turn, is energized from a 120 volt, 60 cycle per second power source 32 through a manually operated switch 33.

The automatic operation of the device is controlled by the microswitch 23 together with four relays designated 40, 50, 60 and 70 and three time delay relays, 29 (mentioned in connection with the manual indexing circuit above), 34 and 35.

The automatic circuit is energized by closing switch 36 which connects the A. C. power source 32 to the cartridge heater 19 and to the motor 24 through the normally closed contacts 41 of relay 40 and the normally closed contacts 51 of relay 50. The rotating finger pushes varistors from the separating index position down to the wax removing machine and, when all the varistors are fed out of the first position, microswitch 23 is automatically closed by the actuator 22 (Fig. 1) on the pusher 12 (Fig. 1) thereby energizing relay 40 and time delay relay 35. Normally closed contacts 41 of relay 40 open, thereby removing the excitation from the motor 24; time delay relays 29 and 34 of the indexing circuit are energized through the operation of normally open contacts 43 (which shunt the "Manual Index" switch 30), and 46, respectively, of relay 40, and relay 50 is energized through the operation of normally open contacts 45 of relay 40.

Time delay relay 35 completes its timing cycle first and closes its contacts 38 to energize relay 60 which, in turn, energizes relay 70 through its contacts 61 and the previously closed contacts 53 and 55 of relay 50. At the instant relay 60 is energized, a reversed polarity excitation voltage is momentarily applied to the motor 24 by the closing of contacts 61 of relay 60 since normally closed contacts 51 and 52 and normally open contacts 54 and 55 of relay 50 have previously been opened and closed respectively, thereby stopping the motor short. The operation of relay 70 opens contact 71 to de-energize relay 60 which removes the potential from the motor 24 by opening contacts 61. Relay 70, however, remains energized through contacts 72.

Time delay relay 29 then completes its timing cycle closing contacts 28 to energize the solenoid 27 to index the table to the next position. When the turntable moves, the actuator 22 is moved off the microswitch 23 which opens; relays 40 and 50 however remain operated through the closed contacts 44 of relay 40. Time delay relay 34 thereupon completes its timing cycle opening its contacts 39 to reset the entire circuit, thereby starting motor 24 to drive the finger 17.

For loading the index table, switch 36 may be opened and the table may be indexed manually by operating push button 30 or the device can be loaded while it is operating by having both energizing switches 33 and 36 closed to permit the machine to separate the articles and index continuously.

It is to be understood that the above described arrangements are simply illustrative of the application of the principles of the invention. Numerous other arrangements may be readily devised by those skilled in the art which will embody the principles of the invention and fall within the spirit and scope thereof.

What I claim is:

1. A machine for separating adhesively united stacked articles comprising a rotary table carrying radially disposed stacks of the articles, means for shearing the articles one at a time from the stacks, a driver for the shearing means, a switch operated upon depletion of the articles of each stack, relays controlled by the switch for sequentially de-energizing the driver and stopping the shearing means, means controlled by the switch for indexing the next stack into the shearing position when the driver is de-energized and means controlled by one of the relays for restarting the driver when the table is indexed to shear articles from the next stack.

2. A machine for separating adhesively united stacked articles comprising a rotary table carrying radially disposed stacks of the articles, means for shearing the articles one at a time from the stacks, a motor drive for the shearing means, a source of electrical power connected to the motor, a switch operated upon the depletion of the articles of each stack, relays controlled by the switch for sequentially disconnecting the source from the motor and momentarily applying the source to the motor with reversed polarity to stop the shearing means, means controlled by the switch for indexing the next stack into the shearing position when the shearing means are stopped and means controlled by one of the relays for restarting the driver to shear articles from the next stack when the table is indexed.

3. A machine for separating adhesively united stacked articles comprising a rotary table carrying radially disposed stacks of the articles, a rotatably finger for shearing the articles one at a time from the stacks, a motor drive for the finger, a source of electrical power connected to the motor, a switch operated upon depletion of the articles of each stack, a relay controlled by the switch for disconnecting the source from the motor, and time delay relays controlled by the switch for sequentially stopping the shearing means by momentarily connecting the source to the motor with reversed polarity, indexing the table to move the next stack into shearing position and reconnecting the source to the motor to drive the finger to shear articles from the next stack.

4. A device for separating adhesively united articles comprising a rotary table having means for carrying a plurality of radially disposed stacks of articles to be separated, a peripheral stop for each of the stacks, means for forcing the stacks against the peripheral stops, means for indexing the table to successively move the radially disposed stacks to a discharge position, means at the discharge position for shearing articles from a stack positioned therein, a motor for continuously driving the shearing means to successively shear the articles from the stack, means operative upon the depletion of articles from the stack for stopping the motor, means operative when the motor is stopped for actuating the indexing means to move the next stack to the discharge position, and means operative when the table is indexed for restarting the motor.

5. A machine for separating stacked articles stuck together with a highly viscous liquefiable material comprising a rotary table having a plurality of radially disposed troughs adapted to slidably accommodate stacks of the articles, a peripheral stop for each of the troughs, means for forcing the stacks against the peripheral stops, means for indexing the table to successively move the troughs to a discharge position, a rotatable finger at the discharge position for shearing articles from a stack positioned therein, means for heating the finger to liquefy viscous material deposited thereon by the engagement of the finger with the articles, a motor for continuously driving the finger to successively shear the articles from the stack, means operative upon the depletion of articles from the stack for stopping the motor, means operative when the motor is stopped for actuating the indexing means to move the next stack to the discharge position, and means operative when the table is indexed for restarting the motor.

References Cited in the file of this patent

UNITED STATES PATENTS

| | | |
|---|---|---|
| 475,281 | Latimer | May 17, 1892 |
| 2,383,207 | Morrell | Aug. 21, 1945 |
| 2,414,937 | Elliot | Jan. 28, 1947 |
| 2,478,982 | Rishell | Aug. 16, 1949 |
| 2,497,718 | Early et al. | Feb. 14, 1950 |
| 2,537,300 | Casey et al. | Jan. 9, 1951 |
| 2,550,884 | Tandler et al. | May 1, 1951 |
| 2,713,878 | Stahl | July 26, 1955 |

FOREIGN PATENTS

| | | |
|---|---|---|
| 847,085 | Germany | Aug. 21, 1952 |
| 1,044,703 | France | June 24, 1953 |